(12) United States Patent
Bove

(10) Patent No.: US 6,368,690 B1
(45) Date of Patent: Apr. 9, 2002

(54) LAMINATED STRUCTURES MADE FROM RECYCLED TIRES

(76) Inventor: Rick L. Bove, 2001 Stover St., Fort Collins, CO (US) 80525

( * ) Notice: Subject to any disclaimer, the term of this patent is extended or adjusted under 35 U.S.C. 154(b) by 0 days.

(21) Appl. No.: 09/718,300

(22) Filed: Nov. 24, 2000

Related U.S. Application Data

(63) Continuation-in-part of application No. 09/453,797, filed on Dec. 3, 1999, and a continuation-in-part of application No. 09/455,344, filed on Dec. 6, 1999, now Pat. No. 6,316,069, and a continuation-in-part of application No. 09/455,345, filed on Dec. 6, 1999, now Pat. No. 6,306,484.

(51) Int. Cl.[7] .................................................. B32B 3/10
(52) U.S. Cl. ...................... 428/56; 428/105; 428/903.3; 156/95; 156/256
(58) Field of Search ............................... 428/56, 48, 58, 428/903.3, 105; 52/DIG. 9; 156/95, 256

(56) References Cited

U.S. PATENT DOCUMENTS 5,340,630 A  *  8/1994  Tripp ........................... 428/54

* cited by examiner

Primary Examiner—Alexander S. Thomas
(74) Attorney, Agent, or Firm—Donn K. Harms

(57) ABSTRACT

A process for manufacturing mats from worn out tires and mats made by that process. Sidewalls are cut from the tire leaving a circular strip, which is cut transversely to produce an elongated approximately rectangular strip. Spaced slits are cut into the long edges of the strips to form slats suitable for use in manufacturing structures. Several strips are placed together to form a first layer, than additional strips are laid over the first strips at an angle to the first layer strips to form a second layer an adhesive is placed on one of the mating surfaces to bond the layers together, forming a mat. An elastomer, may be coated over the mat The mats are particularly useful as horse stall mats, matts for cows in dairy farms, etc.

14 Claims, 5 Drawing Sheets

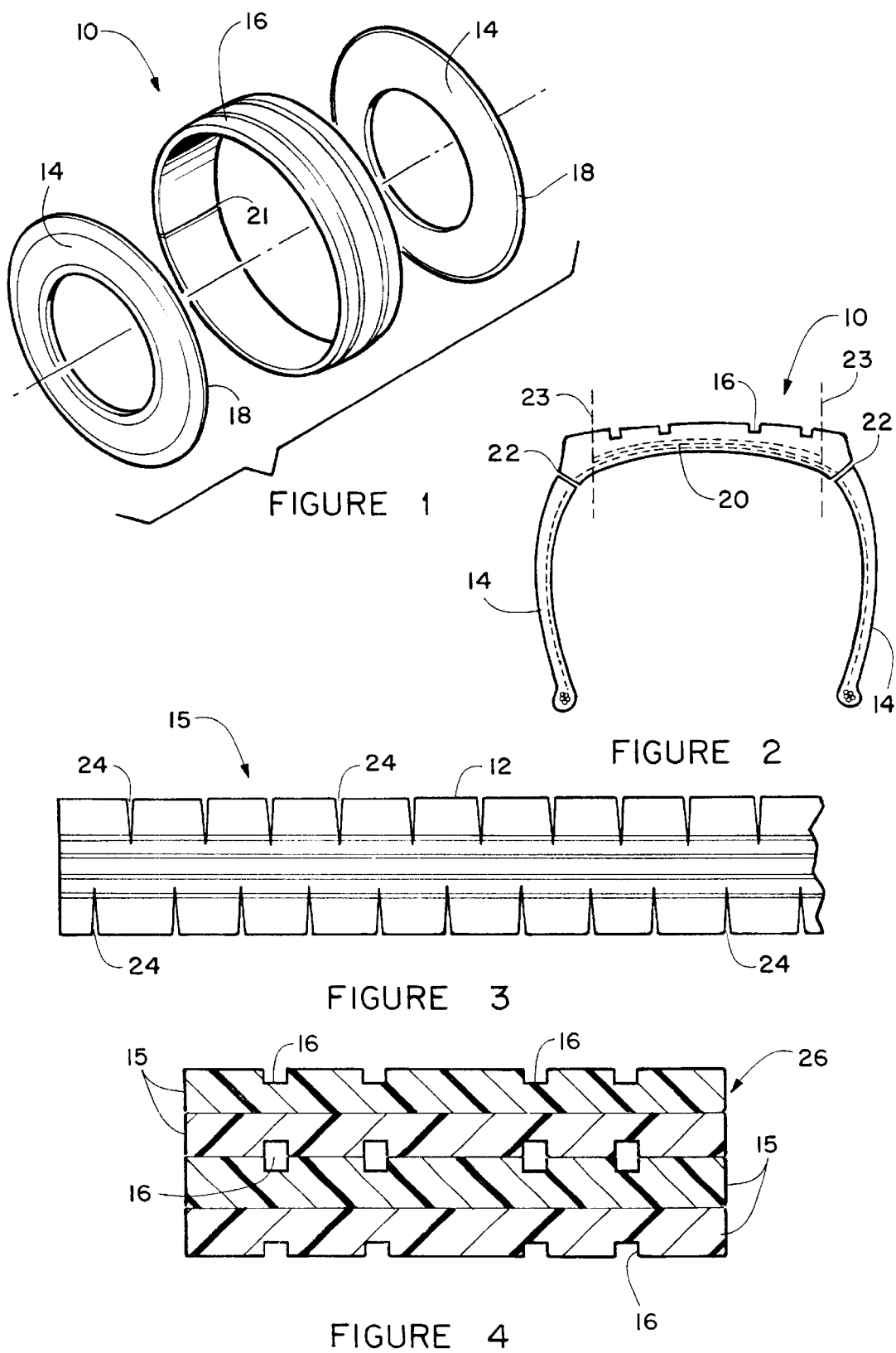

LAMINATED STRUCTURES MADE FROM RECYCLED TIRES

This application is a C-I-part of Ser. No. 509/453,797, filed Dec. 3, 1999 pending and a C-I-P of Ser. No. 09/455, 344, filed Dec.6, 1999 now U.S Pat. 6,316,069 and a C-I-P of Ser. No. 09/455,345, filed Dec.6, 1999 now U.S. Pat. No. 6.306,484

FIELD OF THE INVENTION

This invention relate to the recycling of scrap automobile and truck tires into useful products.

BACKGROUND OF THE INVENTION

Disposing of scrap tires has become a very large environmental problem. Millions of worn out automobile and truck tires are presently being stored in enormous piles or filling canyons. These piles result in visual pollution and sometimes catch fire, with the resulting large, dense, smoke plumes polluting the air for miles down wind. In addition liquid hydrocarbons may be released into the ground water due to pyrolitic reactions as the tires are heated, then burned. These tire pile fires are very difficult to extinguish.

Tires are presently being recycled on a very limited scale. Some are ground into particles useful in road building. Others are used in the creation of artificial reefs to improve lake and ocean fishing. Some are used for barriers around go-cart race tracks. Presently, recycling is consuming fewer tires than are being added to the waste stream.

Attempts have been made to recycle at least parts of tires into structural beams and the like. For example, Snyder in U.S. Pat. No. 5,096,772 describes a beam forming process in which the sidewalls of tires are cut away, the rubber tread portion is sliced away from the steel belts. A thin layer of rubber is vulcanized to the belts and the belts are laminated together. However, this process uses only a small percentage of the tire, requires a complex layup to assure that the tire cords are arranged in different directions in succeeding layers and is quite costly.

Tripp in U.S. Pat. No. 5,340,630 describes a process for recycling the tread portion of tires in which the sidewalls are cut away, the tread portions are joined end to end to form two elongated continuous plies, then the two plies are bonded together to form a long two-ply member. This member can be used as a building material. However, this process is limited to a two ply thickness, is subject to delamination and is not directly useful as a product other than in fabricating other structures.

Similarly, in U.S. Pat. No. 5,412,921, Tripp describes a method of making a structure similar to an I-beam from the elongated plies made in his earlier patent, with plies forming the faces of the I-beam and two plies together forming the I-beam flange. This is a complex, difficult to secure together, assembly. FIG. 6 of the Trip '921 drawing clearly shows the curvature of tire treads that makes difficult the bonding of two plies together to form a double-ply member.

Miller discloses, in U.S. Pat. No. 5,472,750, a method of producing large, thick, mats from tires which includes the steps of slitting the sidewalls and pressing the tire flat to form a preform having a rectangular center area conforming to the tread and a saw-toothed edge corresponding to the sidewalls, then stacking and bonding these preforms. Problems remain in truly flattening the preforms due to lesser sidewall thickness relative to tread thickness. In particular, obtaining tight interlocking of the saw-toothed edges is difficult, since this pattern conforms to the sidewall diameter and sidewall diameters vary greatly.

In U.S. Pat. No. 5,834,083. Pignataro, Jr. describes a tire recycling process including removing sidewalls from the tires, cutting the tread transversely to form strips, fastening the strips with interlocking dovetails and bonding strips together. This process is difficult and requires high accuracy in cutting dovetails. Due to the curvature of the inner surface of the tread material, bonding is difficult and likely to result in bubble formation or central separation of the lamination.

In general, the bonding together of tire tread strips to form two or more ply laminations has been very difficult and likely to result in delamination in use as a structural member. The edges of the tread strips, which curve toward the sidewalls, have a lesser circumference. Or, said another way tread strip edges have a shorter length than the strip centerline when laid flat. This difference makes flattening the tread very difficult.

Therefore, there is a continuing need for improvements in guard rail systems that recycle portions of used tires, that are strong and resilient, are highly resistant to impact damage, that will not deteriorate when exposed to severe weather and freeze/thaw cycles and that can be provided with a reinforcing surface coating having any desired color.

SUMMARY OF THE INVENTION

The above-noted problems, and others, are overcome by recycling scrap automobile, truck, etc., tires into a structural member which is superior to present similar structural members. The basic structural member, or "slat", is a tread strip cut from worn out tires, cut to a predetermined width with slits formed along the long edges of the strip and extending transversely toward the strip centerline. Slats of this sort may be laminated in a variety of ways to construct larger structures, such as parking stops, guard rails systems, walls (such as for tornado rooms or the like), floor panels or mats, etc.

The first step in constructing a larger structural member is securing two slats together face-to-face manner with similar sides in contact, i.e., tread surface to tread surface and inside surface to inside surface. Any suitable means may be used to secure the strips together. Typically, adhesive bonding and/or mechanical fasteners such as staples and ring nails may be used.

Useful structures can be made using these two layer laminates. A mat may be made by arranging a layer of slats in a parallel relationship, then laminating a second layer over the first layer with slats in the two layers lying at an angle to each other, typically about 90°. These mats can have any desired dimensions. Uses include horse stall mats, mats for diary cows, etc. Where mats having uniform thickness are desired, the mats may be trimmed to the desired thickness or the slats may be trimmed to half of the desired mat thickness. Planing or abrading are preferred methods of trimming thickness.

A number of such unitary pairs of slats can be laminated to produce a beam-like structural member having any desired thickness. Typically, the slats have widths of about six to eight inches. The slats have lengths typically in the range of about five to eight feet. Structural members of any length can be produced by trimming the slats for shorter structural members or laminating slats in a staggered manner for longer ones.

The completed structural member may be coated with any suitable coating having any desired color. The polyurethane based coatings of the sort presently used for coating pick up truck beds is preferred for adding strength and sealing to the lamination. In another preferred embodiment a coating or layer of a material such as a recycled rubber compound may be molder over the structural member.

The structural members are made by a process that comprises the steps of removing the tire sidewalls (which can be ground for road building particles or other uses), cutting the tread portion transversely to form an elongated strip, trimming the strip to a selected width and/or thickness, slitting the strip edges transversely inward toward the tread longitudinal centerline to a depth of from about one inch to about the full depth of the tread longitudinal centerline, with these slits located every 1 to 4 inches along the strip. The slits are preferably evenly staggered, with a slit on one side spaced equally between slits on the opposite side.

These strips may then be secured together in unitary pairs, then additional slats(individual or added unitary pairs) may be secured to both sides of the first unitary pair to provide any suitable number of tread laminations to produce the desired product thickness. While adhesive bonding of slats is optimum in most cases, producing an outstanding combination of strength, resiliency and resistance to separation, mechanical fasteners, such as staples or ring nails, may be used if desired. In some cases both adhesive bonding and mechanical fasteners may be used.

It is desirable that the slats be trimmed to a selected width to correspond to the structural member width desired. For example, automobile tires can be cut to a 6 inch width, with truck tires capable of producing slats having 7 to 10 inch widths. Automobile tires produce slats having lengths of approximately 5 to 8 feet, while truck tire slats have lengths of approximately 6 to 9 feet. The slats can be cut to any desired lesser length.

The slats, two or more layers in stacked or mat arrangements, are laminated under high pressure, preferably from about 60 to 120 psi, although any other suitable pressure levels may be used if desired. Typically, a steel beam or plate may be hydraulically pressed against the two or more stacked slats in an open topped, box-like mold to form a mat or beam-like structure. While slats may have uneven thickness in some areas due to uneven side to side wear or other reasons, we have found that laminating at an elevated pressure will produce structures having substantially uniform thickness. A beam may have a plurality of holes through which mechanical fasteners, such as ring nails, can be inserted into the material being pressed.

The exterior of a laminated structure may be coated with any suitable material to seal the surface and provide a desired color. In a particularly preferred embodiment, a coating of a high strength elastomer is sprayed onto the structural member to a thickness of at least 1/8 inch. In another preferred embodiment a coating or layer of a material such as a recycled rubber compound may be molder over the structural member. This will provide an attractive surface of any desired color and will further reinforce and seal the structure. With such a coating, staples or other mechanical fasteners are generally sufficient to secure the slats together.

BRIEF DESCRIPTION OF THE DRAWING

Details of the invention, and of preferred embodiments thereof, will be further understood upon reference to the drawing, wherein:

FIG. 1 is an exploded perspective view of a tire with the sidewalls cut away and the tread portion transversely cut;

FIG. 2 is a cross section through the tire showing the preferred lines along which the tire sidewalls are cut;

FIG. 3 is a plan view of a tread portion slat with spaced edge slits;

FIG. 4 is a transverse cross section through an assembly formed from four tread slats;

DETAILED DESCRIPTION OF PREFERRED EMBODIMENTS

Figure 5:
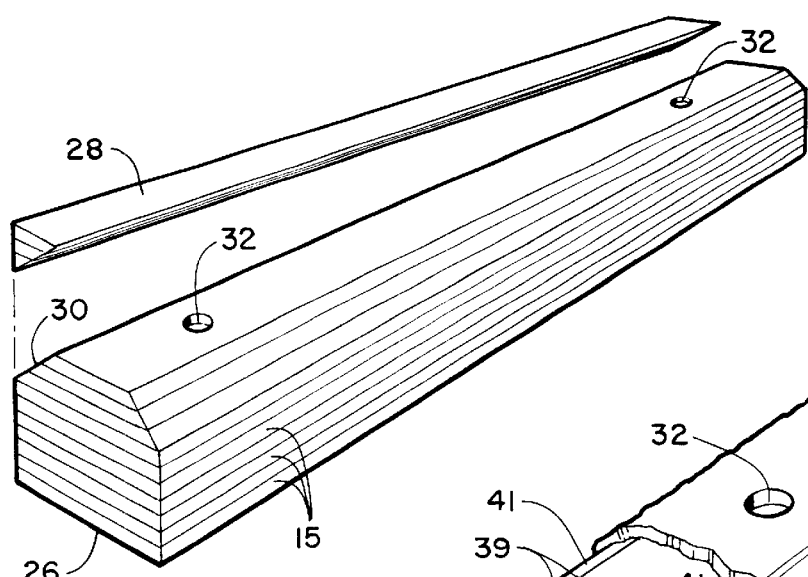
FIG. 5 is an exploded perspective view of a parking stop.

Referring to FIGS. 1 and 2, there is seen a tire 10 having a circular strip 12 which is basically the tread portion of the tire and two sidewalls 14. Typically, tire 10 is a conventional automobile or truck tire, which is worn to the point where the depth of tread grooves 16 is too shallow for safe use of the tire on a vehicle. Other pneumatic tires, such as those used on golf carts, bicycles and the like could be used, although the numbers of those tires available is quite small.

Sidewalls 14 are trimmed from the strip 12 by any suitable means. Any suitable trim line may be used. Optimally, the trim line is approximately at line 22 in FIG. 2, at the line where the thickness of the sidewall expands to become tread, but outside of the belt cords 20.

Once sidewalls 14 have been removed, strip 16 is cut transversely at line 21, producing a long rectangular strip, typically about 6.5 feet for automobile tires with truck tire slats somewhat longer. The sidewalls may be recycled in any suitable manner. The tubular strip 12 is cut transversely to form a generally rectangular strip. Preferably, strip 12 is then trimmed along the sides to provide a uniform strip width.

As can be seen in FIG. 2, strip 12 is rounded or crowned, with the edges having a smaller circumference than the central portion of the tread. In the prior art, attempts were made to bond such strips 12 together. However, since the strip 12 edges are shorter than the central area, the slats will not lie flat. If coated with an adhesive and pressed into a flat assembly of two or more strips 12, initially the laminate may appear to be flat and uniform. However, the high internal tension inherent in such an assembly will cause the assembly to delaminate and/or bubble at the strip interfaces, result in great weakening and loss of structural integrity.

As seen in FIG. 3, cutting slits 24 into the edges of tread strip 12 will produce a slat 15 which is flat and therefore a preform suitable for the manufacture of a variety of structures. Preferably, the tread strip 12 is trimmed to a desired uniform width before cutting the slits. Trim lines 23 in FIG.

2 show a preferred trim line. The trimmed to width and slit strip is referred to as a "slat" hereinafter.

The slits 24 are critical to the effectiveness of the process and the structural integrity and strength of the products produced. For a slat 15 cut from an automobile or truck tire having a width of about six inches, the slits are preferably spaced about one to four inches apart and have depths of from about one inch to about the centerline of the strip. Optimally, the slits are spaced about three inches apart and have depths of about two inches. For slats 15 cut from truck tires with slat widths of about seven or eight inches, the optimum slit spacing is about three inches and slit depth is inward to about 40% of the slat width.

In constructing a laminated product, initially two slats 15 are bonded together, preferably by an adhesive although staples or other fasteners may be used in some cases, as described below. The slats 15 are bonded face-to-face with similar sides in contact; that is, grooved outer surfaces together or smooth inner surfaces together. Preferably the surfaces of slats 15 are buffed or abraded to remove any contaminants and improve adhesive bonding.

To build up a thick, beam-like, structure, additional slats or pairs of slats 15 are bonded to the two initial slats to form a beam 26 as seen in FIG. 4. Preferably, same sides are always bonded together to cancel out crown effects. Thus, as shown in FIG. 4, the inner surfaces of the next slats are bonded to inner surfaces of the first pair of slats. In a preferred arrangement, pairs of slats are bonded together, inside surface to inside surface, then these two-slat preforms are further stacked and bonded together to produce structures of the desired thickness, e.g. four, six or eight slats thick.

One preferred final product for this process is a parking stop as seen in FIG. 5. The two upper corners 28 are cut away to leave a beveled upper surface 30. Two or more holes 32 are drilled through the beam to receive stakes or the like to hold the parking stop in place. This is a highly effective parking stop that is resilient with some give upon impact. The parking stop will not break when impacted or subjected to freeze-thaw cycles as happens with concrete stops and will absorb energy when the impact is higher than normal, avoiding damage to either the vehicle or the parking stop.

Figure 6:
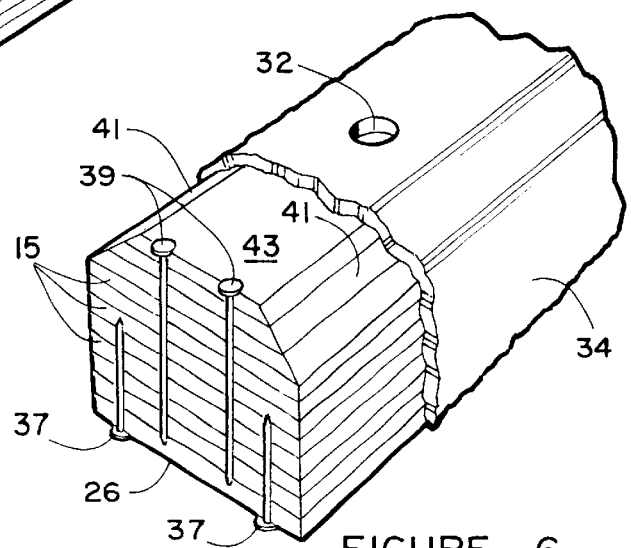
FIG. 6 is a transverse section view through the parking stop of FIG. 5 with an added elastomer coating.

An alternate embodiment of a parking stop is illustrated in FIG. 6. Here, beam 26, after the upper corners are removed, a coating 34 is applied to the beam. Preferably all external surfaces are coated. The coating should have a thickness of at least about 1/16 in., with coatings having thickness in the range of from about 1/16 to 3/8 in. being preferred. The elastomer coating may have any desired color, e.g. blue for handicapped parking spaces. Any suitable elastomer coating may be used. Typical coatings are those applied by spraying or molding.

While the slats 15 making up beam 26 may be bonded together with an adhesive, as described above, mechanical fasteners such as ring nails or the like may be used in the manufacture of this embodiment, if desired, since coating 34 assists in maintaining the beam structure. The ring nails should include nails 37 inserted from the bottom of the structure, closely adjacent to where bevel 41 begins and nails 39 inserted from the flat top portion 43 adjacent to bevel 41. Alternatively, ring nails could be inserted into the top along a direction parallel and adjacent to the bevels, with another nail inserted through the top center, perpendicular to the top.

Figure 7A:
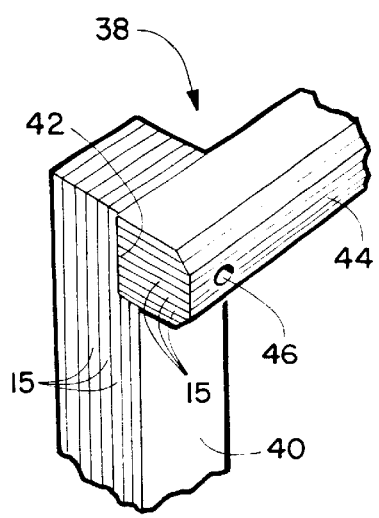
FIG. 7a is a perspective view of a first embodiment of a guard rail using a plurality of slats.

Another preferred product is illustrated in FIG. 7a. Here, a guard rail system 38 is made up of laminated beams 26. Posts 40 have slats running vertically and have a suitable length for embedding a suitable distance into the ground. A notch 42 is cut into the upper ends of posts 40 to receive an elongated rail 44 having a cross section of the sort shown in FIGS. 5 and 6. Rails 44 preferably extend out from posts 40 to receive the initial impact of a vehicle striking rail system 38. Because of the resiliency of rails 44 and posts 40, the system will give somewhat with impact, absorbing impact energy and reducing damage to the impacting vehicle, as would happen with a rigid guard rail. Once the impacting vehicle is removed, the rails will substantially return to their original position rather than bending and crushing as is the case with conventional metal rails. Rails 44 may be secured to posts 40 by any suitable means, such as the through bolts 46 shown, lag screws, adhesives, etc.

Figure 7B:
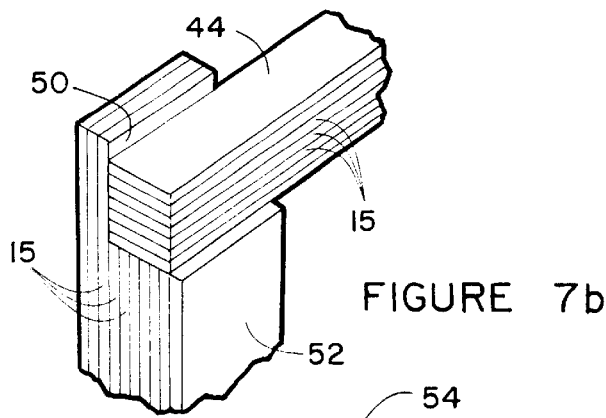
FIG. 7b is a perspective view of a second embodiment of a guard rail.

A second embodiment of a guard rail system 38 is shown in FIG. 7b. Here, a square or rectangular rail 44 is mounted in a large notch 50 in post 52. This arrangement has energy absorbing characteristics and ability to return to shape after impact as described above. Because of the greater contact area between rail 48 and notch 50, an adhesive bonding between post and rail will generally be sufficient. However, bolts, screws or the like may be used as a further reinforcement of the attachment, if desired.

Figure 7C:
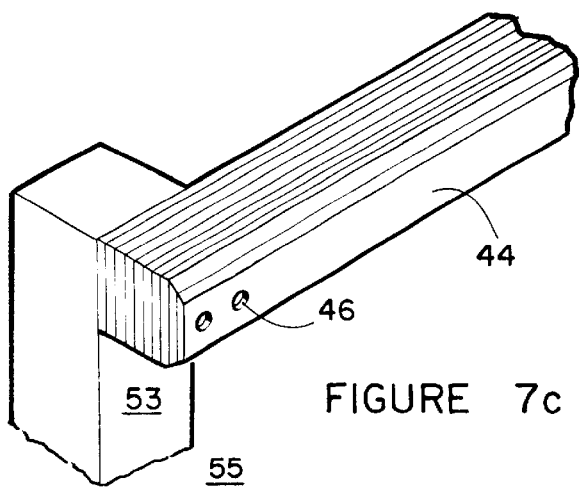
FIG. 7c is a perspective view of a second embodiment of a guard rail.

A third embodiment of a guard rail system 38 is shown in FIG. 7c. Here, post 53 is rectangular in cross section over its entire length, including the portion extending below ground level 55. Rail 55 is secured to the side of post 53 by a through bolt 46 or the like. Preferably the head of bolt 46 is recessed, as seen in the cut-away portion of rail 55.

Figure 8:
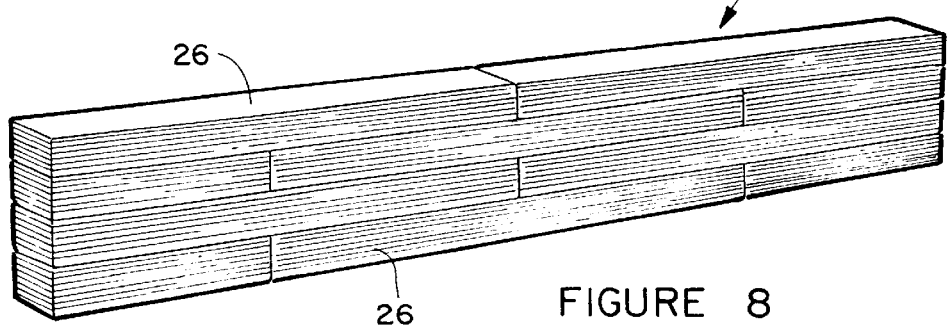
FIG. 8 is a perspective view of a beam formed from a plurality of slats.

As shown in FIG. 8, walls or other large panels 54 may be formed from the beams 26 produced by laying up slats 15. Each beam will have a length of around 6 to 8 feet, depending on the circumference of the tires used. These beams 26 may be bonded together in a staggered relationship with adhesives, screws, or other suitable fasteners as desired. The lengths of beams 26 may be trimmed to provide shorter pieces for wall ends, corners and the like.

Walls 54 made as described will be strong and resilient, resistant to impacts that would cause cracking in a concrete block wall. These walls may be coated with an elastomer coating of any desired color, as described above. Walls 54 are particularly suitable for use in building tornado rooms and the like because of their strength and resiliency.

Figure 9:
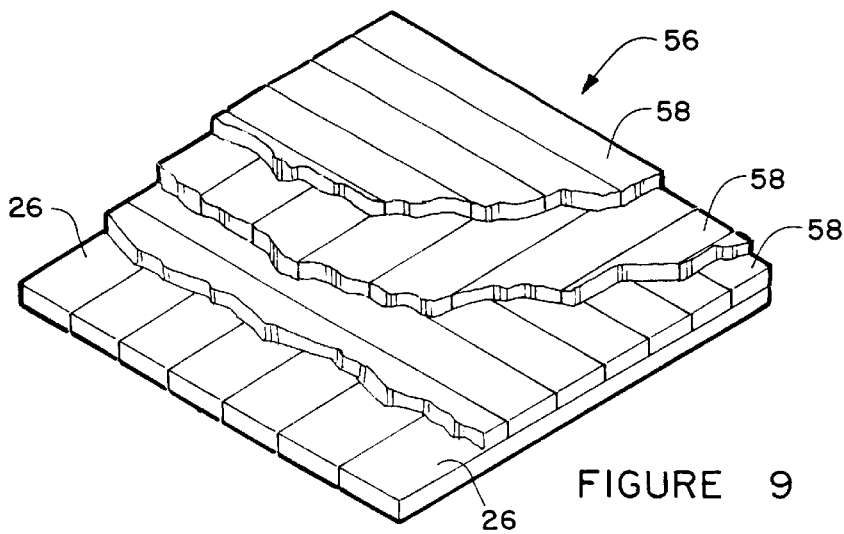
FIG. 9 is a perspective view, partly cut-away, of a panel made of plural layers of strips.

Another preferred structure using the slats of this invention is shown in FIG. 9. Here, a plurality of preforms 26 (which could be one or more slats thick) of predetermined thickness are laid up adjacent to each other to form overlying layers 58 producing a flexible, high strength panel or mat 56. The direction of layers 58 is rotated 90° from layer to layer to provide maximum strength in each direction. Other orientations could be used if desired, such as a 30° or 60° relative rotation of each succeeding layer.

The abutting edges of the slats 26 in each layer 58 may be bonded with any suitable adhesive. Each layer may be secured to contiguous layers in any suitable manner, such as with an adhesive or mechanical fasteners. Ring nails are preferred where mechanical fastening is chosen. Panel 56 is both strong and resilient and can be used as a structural member in construction, and is particularly suitable for school playgrounds, railroad crossing mats, etc. Where uniform product thickness is desired, the surfaces of the slats or product may be trimmed, such as by planing or abrading, to produce an end product having the desired dimensions. For example for mats to be used in horse or cattle stalls, slats may be trimmed to uniform 3/8 inch thickness to provide the standard ¾ inch thick mat for such uses, or the laminated mat may be trimmed to ¾ inch thickness.

Figure 11:
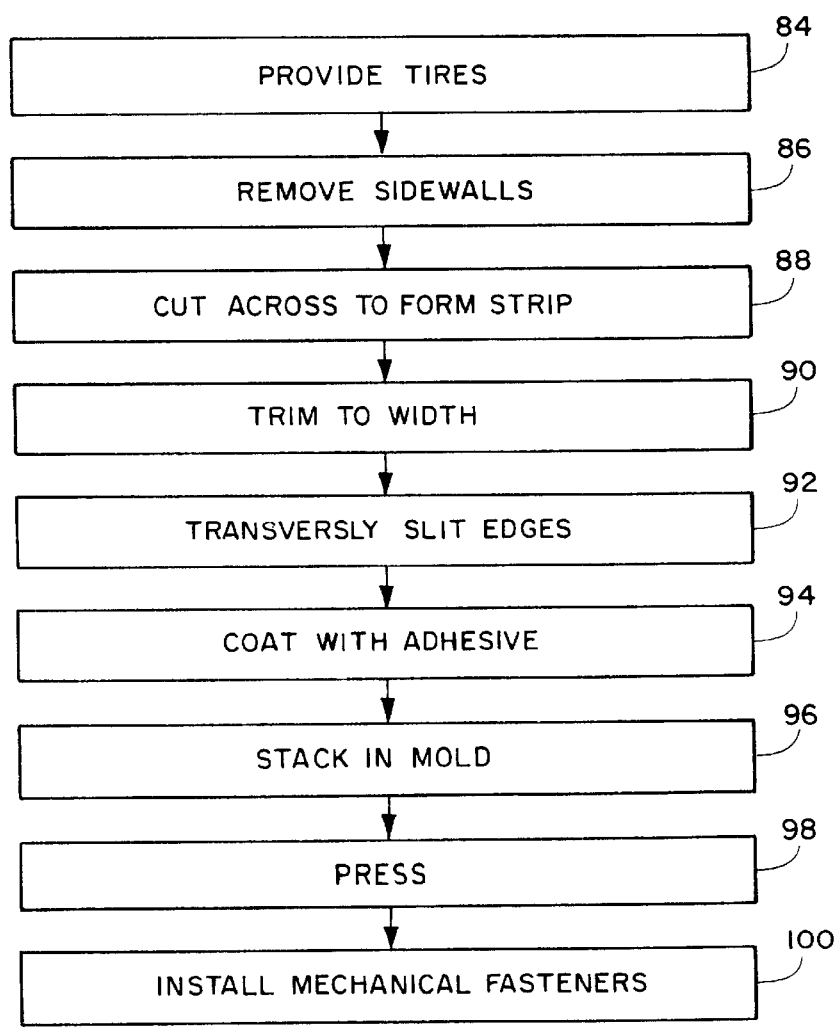
FIG. 11 is a flow diagram of a second embodiment of the process.

A first preferred embodiment of the process of manufacturing various laminated products from worn out tires is summarized in the flow diagram of FIG. 11.

Initially, scrap tires are taken to the manufacturing facility as indicated in block 62.

The first manufacturing step is removing the sidewalls from the carcass as indicated in block 64, typically by cutting with a knife, sawing etc. This leaves a circular tread strip, with edges that inherently have a smaller circumference than the center portion of the tread.

The circular strip is cut transversely, as indicated in block 68 to produce an approximately rectangular strip. The strip at this point will not lie flat and, if bonded to another strip under high pressure, will tend to bubble or delaminate in use.

The strip is then cut to the desired width, as indicated in block 68. Typically, the strip is trimmed with a band saw or other suitable saw.

Spaced slits are cut into the long edges of the strip, as indicated in block 70, with the spacing and depth described above, to produce the flat slat 15 as described above. These slits are critical to durable bonding, since they allow the slat to lie flat because the tensions in the edges that are shorter than the longitudinal centerline of the slat are relieved.

Two slats are then pressed and secured together, as indicated in block 72 with similar faces in contact. Where mats of the sort shown in FIG. 9 are to be made, two layers of contiguous slats are assembled for pressing. Either two outer, tread bearing surfaces or two inner, smooth surfaces are secured together. In most cases, the slats are preferably bonded by flexible adhesive. Mechanical fasteners may be used in place of the adhesive, or in addition to that adhesive, if desired. The slats are preferably pressed at a pressure of about 100 to 200 psi.

Additional bonded pairs of slats may be then secured to the first two to lay up any desired overall beam thickness desired, as indicated in block 74. The added slats preferably are secured with similar faces in contact, that is, tread surface to tread surface or smooth inner surface to smooth inner surface. This arrangement is important to obtaining a straight beam, since bonding other surfaces may distort the beam due to the tire tread inherent crown.

Typically, the slats are bonded in a press, such as one using an open-topped mold conforming to the slat width and length, with a sturdy steel beam or plate extending the length of the opening and hydraulic pistons to press the beam or plate down against a stack of two or more slats in the mold. Where the slats are to be secured together with an adhesive that is applied to the contacting surfaces before placement in the mold. Where the slats are to be secured together with a mechanical fastener, such as ring nails or staples, openings may be provided in the beam through which the fasteners may be installed with a conventional nail gun.

The beams or mats produced in block 74 may be cut to length as indicated in block 76. Or, they may be trimmed to a desired configuration as indicated in block 80. Typically, the configuration may by the parking stop shown in FIGS. 5 and 6 or a mat as seen in FIG. 9.

The final shaped product may be coated with an elastomer coating of any desired color, as indicated in block 78. The steps in the sequence of FIG. 11 may be varied, where suitable and other modifications may be made to slats and beams between the basic series of steps shown.

Figure 10:
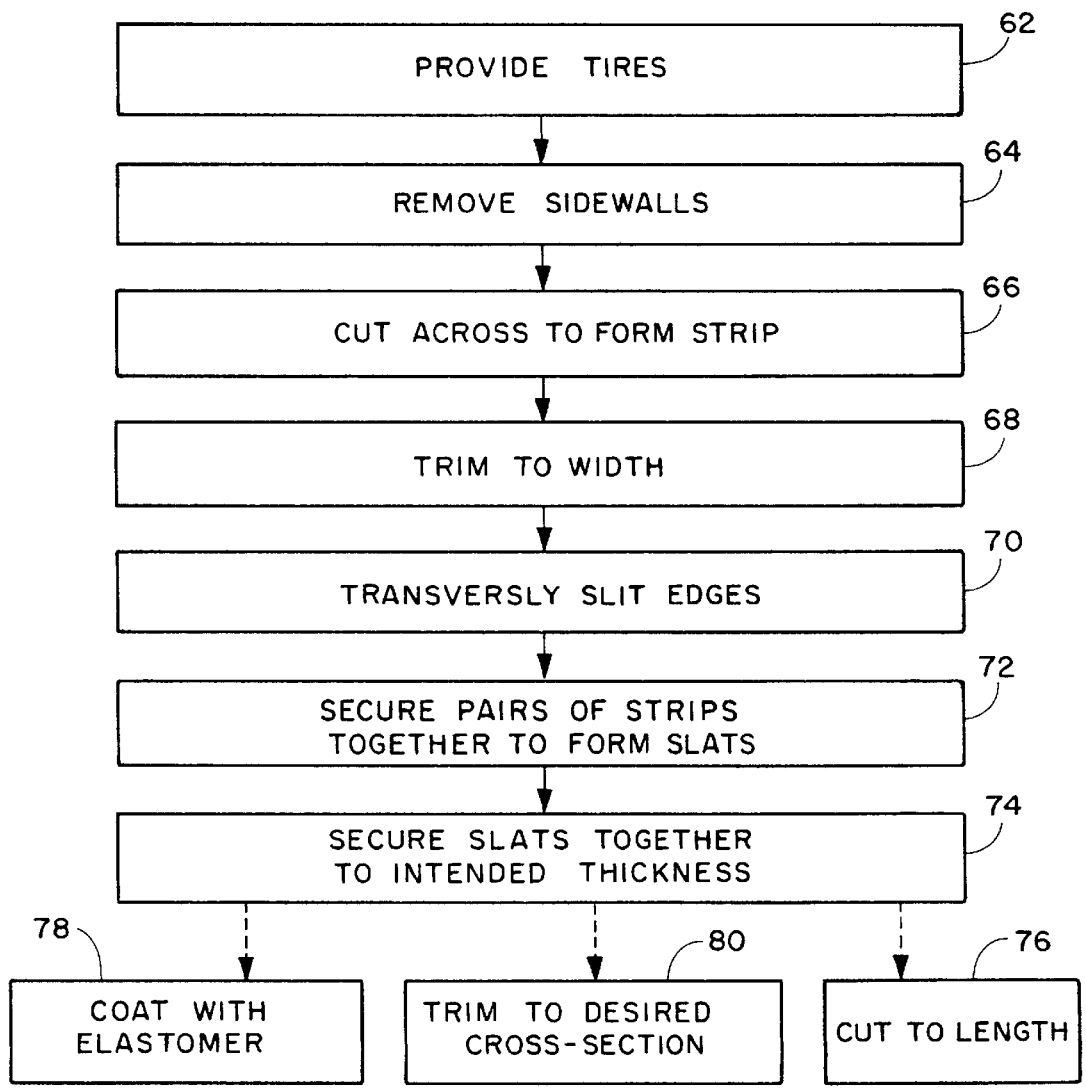
FIG. 10 is a flow diagram of a first embodiment of the process of this invention.

An alternative embodiment of the process of this invention is illustrated in the block diagram of FIG. 11. The initial steps are the same as described in conjunction with the description of FIG. 10. Tires are selected and provided to the manufacturing facility, as indicated in block 84. The sidewalls are removed as indicated in block 86. The tubular strip is then cut transversely as indicated by block 88 to produce an approximately rectangular strip, which is cupped towards the inside due to the smaller tire edge circumference, as detailed above. The strip is then trimmed to width as shown in block 90.

In a critical step, the long edges of the strip are slit transversely to the optimum degree, as detailed above and indicated in block 92. While the slits on opposite sides may have any suitable relationship, the slits preferably staggered along the sides, with a slit on one side between slits on the opposite side. Preferably the surfaces of slats 15 are buffed or abraded to remove any contaminants and improve adhesive bonding.

A predetermined number of strips having approximately equal lengths and widths are prepared as described above. A first strip is coated on one side and placed in a mold that resembles an open topped box, with the coating upwards. Additional strips are coated with adhesive on both sides and placed one at a time in the mold, as indicated by block 96. A final strip (the second strip where a two-layer product is being produced) is coated and placed adhesive side down on the stack. This coating series is indicated in block 94. A press platen, typically a steel beam or plate having a surface corresponding to the opening in the mold is placed over the stack of two or more slats and pressed against the stack, typically by hydraulic cylinders, as indicated in block 98. The structure may be trimmed to a desired thickness or configuration at this point, if desired.

The press platen has a plurality of small, spaced openings exposing the top of the strip stack. Mechanical fasteners, such as staples or ring nails, may be inserted into the stack through these holes by a conventional nail gun.

This process produces an extremely sturdy final product, with the strips very securely fastened together. If desired, depending on the adhesive selected, only one of each pair of abutting strip surfaces could be coated with adhesive, rather than coating both surfaces. Further, if desired, either the adhesive coating or the mechanical fasteners could be omitted without severely weakening product structural integrity.

Figure 12:
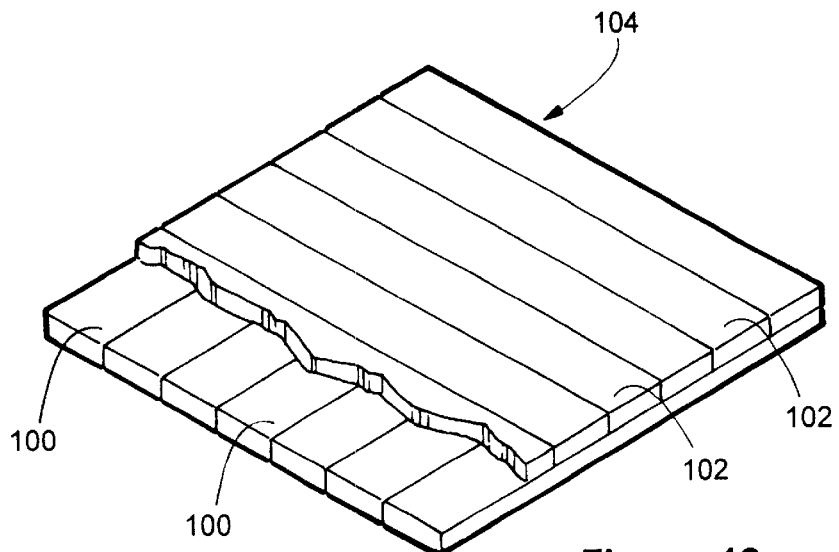
FIG. 12 is a perspective of a mat embodiment of the invention.
Figure 13:
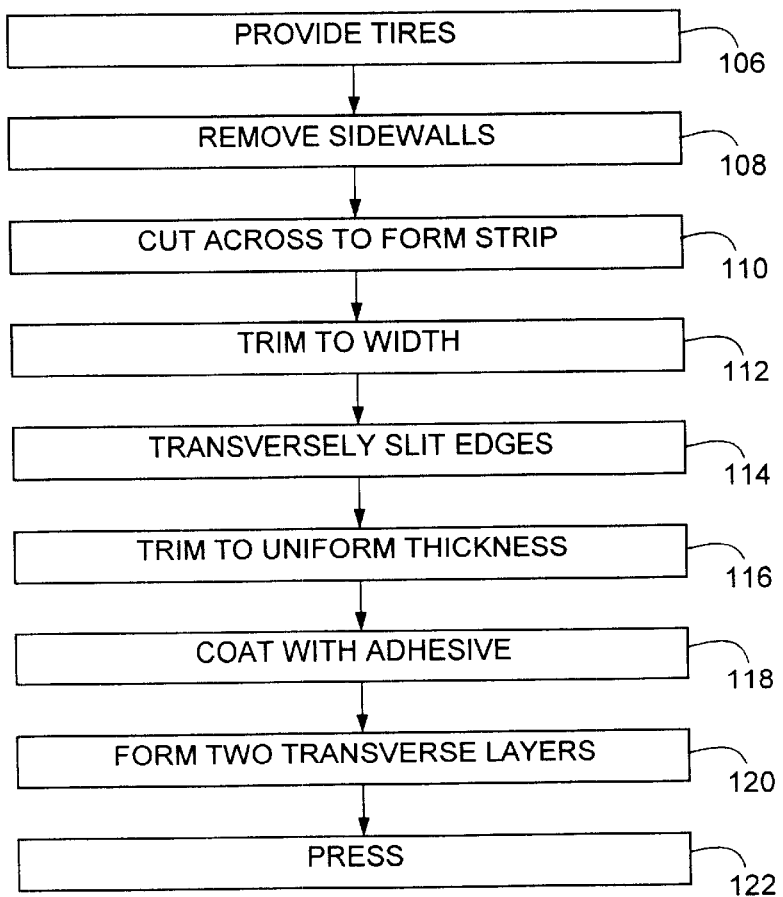
FIG. 13 is a flow diagram of the method of making the mat embodiment.

FIGS. 12 and 13 illustrate the structure of the mat embodiment and process of making that embodiment. In FIG. 12, it can be seen that the mat consists of two layers, a first layer of contiguous strips 100 is arranged with the strips contiguous and forming a generally rectangular shape. A second layer is formed by arranging a second set of strip 102 over the first layer, with the strips 102 at an angle (preferably about 90°) to strips 100 to form a two-layer mat 104.

The flow diagram of FIG. 13 illustrates the method of making mat 104. A number of conventional tires are provided, as indicated in block 106. The sidewalls are removed, producing strips, per block 108. The strips are cut across and trimmed to form substantially equal sized strips, as indicated in blocks 110 and 112. Transverse slits are formed in the edges of the strips as detailed above and indicated in block 114. The strips are trimmed to a predetermined substantially uniform thickness as shown in block 116. The first or lower layer of strips 100 is coated with an adhesive, per block 118. If desired, the strips 102 could be coated with the adhesive, then laid in place. Or. Both strips 100 and 102 could be coated.

The two layers of strips 100 and 102 are laid up as seen in FIG. 12 and block 120. The resulting mat 104 is then pressed if desired to form a mat of predetermined thickness. In some cases pressing is not required or the mat could be rolled. An elastomer coating may be applied to the mat. The result is a mat suitable for use in horse stall, dairy barns, etc. The mats will lie flat and will provide an even surface over a plurality of adjacent mats.

While certain specific relationships, materials and other parameters have been detailed in the above description of preferred embodiments, those can be varied, where suitable, with similar results. Other applications, variation and ramifications of the present invention will occur to those skilled in the art upon reading the present disclosure. Those are intended to be included within the scope of this invention as defined in the appended claims.

I claim:

1. A mat which comprises:

a plurality of tread strips cut from a tire;

said tread strips each having a generally rectangular configuration with a substantially uniform width and having two short ends and two long sides;

a plurality of spaced transverse slits cut into said long sides, said slits having depths of from about 1 inch to about 40% the strip width and spaced apart from about 1 to 4 inches;

each of said tread strips trimmed to a predetermined thickness;

a first strip layer having a plurality of said tread strips arranged with said tread strips parallel and said long sides in contact;

a second strip layer overlying said first strip layer and having a plurality of said tread strips arranged with said tread strips parallel and said long sides in contact and said long sides at a predetermined angle to long sides of strips in said first layer; and means for securing said first and second layers together to form a mat.

2. The mat according to claim 1 wherein said securing means comprises layer of adhesive between said first and second layer.

3. The mat according to claim 2 further including a layer of adhesive between at least some of said contacting long edges.

4. The mat according to claim 1 wherein said securing means comprises mechanical fasteners extending at least partially through said tread strips in said first and second layers.

5. The mat according to claim 1 wherein said predetermined angle is approximately 90°.

6. The mat according to claim 1 further including an elastomer coating over at least a portion of said mat.

7. The mat according to claim 1 wherein said strips have widths of about 6 inches, said slits are spaced about 3 inches apart and have depths of about 2 inches.

8. The mat according to claim 1 wherein said strips have uniform widths of about 7 to 8 inches, said slits are spaced about 3 inches apart and have depths of about 40% of slat width.

9. A method of manufacturing a mat which comprises the steps of:

providing a plurality of tires, each having a tread portion and sidewalls;

cutting strips from the tread portion of said tires, said strips being approximately rectangular and having two short ends and two long edges;

cutting a plurality of spaced transverse slits into said long edges, said slits having depths of from about 1 inch to about 40% of the strip width and spaced about 1 to 4 inches apart;

arranging a first layer of strips with long edges in a parallel, contiguous arrangement;

arranging a second layer of strips with long edges in a parallel, contiguous arrangement;

applying an adhesive to a surface of at least one of said first and second layers;

pressing said layers together with said long edges of said second layer at an angle to said long edges of said first layer and with said adhesive between said layers.

10. The method according to claim 9 wherein said long edges of said second layer are arranged at an angle of approximately 90° to said long edges of said first layer.

11. The method according to claim 9 further including coating at least a portion of said mat with an elastomer.

12. The method according to claim 11 wherein said elastomer is a recycled rubber material.

13. The mat according to claim 9 including cutting said strips to substantially uniform widths of about 6 inches, spacing said slits about 3 inches apart and cutting said slits to depths of about 2 inches.

14. The mat according to claim 9 including cutting said strips to substantially uniform widths of about 7 to 8 inches, spacing said slits about 3 inches apart and cutting said slits to depths of about 40% of slat width.

* * * * *